United States Patent [19]

Nishida

[11] 4,383,811
[45] May 17, 1983

[54] CORD TENSION DEVICE FOR PLUG MAKING MACHINE

[75] Inventor: Eiithi Nishida, Sakai, Japan

[73] Assignee: Tokai Electric Wire Company Limited, Yokkaichi, Japan

[21] Appl. No.: 223,306

[22] Filed: Jan. 8, 1981

[30] Foreign Application Priority Data

Jan. 11, 1980 [JP] Japan .................................. 55-2336

[51] Int. Cl.³ ........................ A23G 1/20; B22D 19/04
[52] U.S. Cl. ................................. 425/123; 425/126 R
[58] Field of Search ............... 264/229, 271, 273, 243; 425/123, 126 R

[56] References Cited

U.S. PATENT DOCUMENTS 16,754  3/1857  Sanders ............................. 264/229
2,859,936  11/1958  Warnken ................................ 264/4
4,236,689  12/1980  Hass .................................... 425/123

FOREIGN PATENT DOCUMENTS 55-33151  8/1980  Japan .
56-40953  9/1981  Japan .

Primary Examiner—Jay H. Woo
Attorney, Agent, or Firm—Cushman, Darby & Cushman

[57] ABSTRACT

A cord tension device for use in plug making machine for forming a plug and a cord protector integrally on one end of electric cord. The plug making machine has a mold device having a plurality of mold cavities for receiving the cord ends and a holding device for holding the plug terminals and cord ends in the right places within the mold device. The cord tension device has a clamp device which is adapted to clamp the cord portion projecting out of the mold device and a driving device adapted to drive the clamp device away from the mold device thereby to impart a tension to the cords received by the mold device. In consequence, the cord ends are located and set correctly along the axes of the mold cavities under application of tension, so that the cord protector is formed to have a uniform thickness distribution in the circumferential direction.

4 Claims, 7 Drawing Figures

CORD TENSION DEVICE FOR PLUG MAKING MACHINE

BACKGROUND OF THE INVENTION

1. Field of the Invention

The present invention relates to a plug making machine for forming a plug and a cord protector integrally at one end of an electric cord and, more particularly, to a cord tension device for use in the plug making machine of the type stated above.

2. Description of the Prior Art

A considerably large bending stress is generated at the junction between a flexible electric cord and a solid mold plug and the life of the electric wire in the cord becomes short due to the generation of such stress. Under these circumstances, there have been proposed a variety of cords having a cord protector at the portion of the cord subjected to the bending stress to protect the cord against breakage. In these electric cords, the cord protector is formed integrally with the plug at one end of the cord. In order that the cord protector provides the expected protection effect, it is essential that the cord protector is formed on the cord surface with a uniform circumferential thickness distribution. For obtaining such a uniform thickness distribution of the cord protector, it is necessary to apply a tension to the cord after placing one end of the latter in the mold cavity, so that the cord may be set in a tensed state correctly on the axis of the cavity during molding. This setting of the cord has been made heretofore wholly manually by pulling the cord away from the mold by operator's hand. This work is very troublesome and the positioning of the cord correctly on the cavity axis is extremely difficult to conduct.

SUMMARY OF THE INVENTION

Under these circumstances, the present invention aims at providing a cord tension device for plug making machine, capable of automatically pulling the cord to efficiently and correctly locate the cord end in the mold cavity under application of a tension.

To this end, according to the invention, there is provided a cord tension device for use in a plug making machine of the type having a mold device with a mold cavity for receiving a cord end connected to a plug terminal and a holding device for holding the plug terminal and cord end at a predetermined position in the mold device, the cord tension device comprising: a clamp means disposed outside of the mold device and adapted to clamp the portion of the cord extending out of the mold device; and a driving means for driving the clamp means away from the plug terminal along the axis of the cavity to correctly position and set the cord end in the mold cavity.

BRIEF DESCRIPTION OF THE DRAWINGS

The invention will be described hereunder, by way of example, with reference to the accompanying drawings in which.

Throughout the drawings, the same reference numerals are used to denote the same parts or members.

DETAILED DESCRIPTION OF PREFERRED EMBODIMENT

Figure 1:
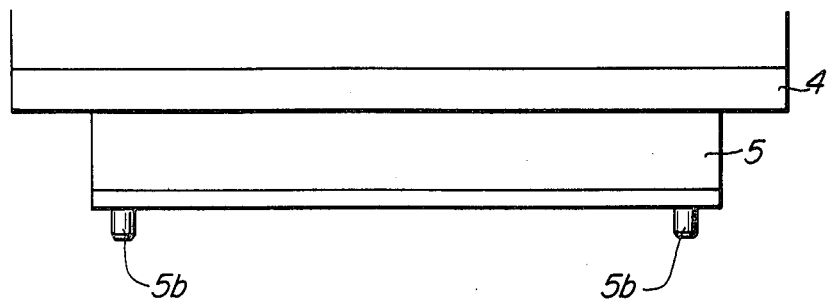
FIG. 1 is a front elevational view of a cord tension device in accordance with an embodiment of the invention, in the state lowered together with a movable mold part of a plug making machine.
Figure 1:
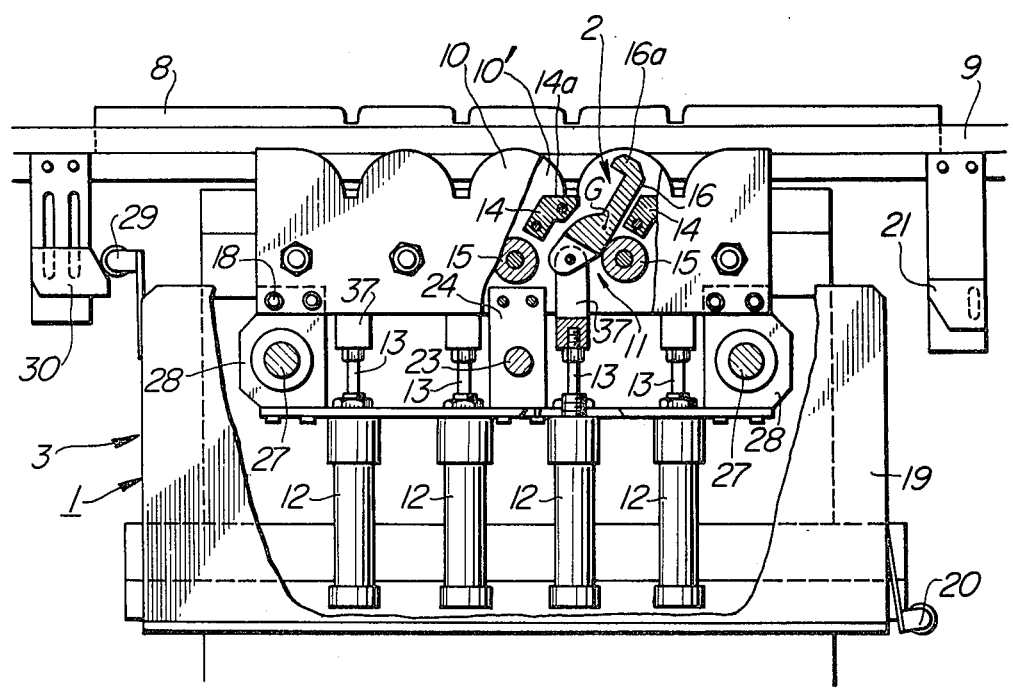
Figure 2:
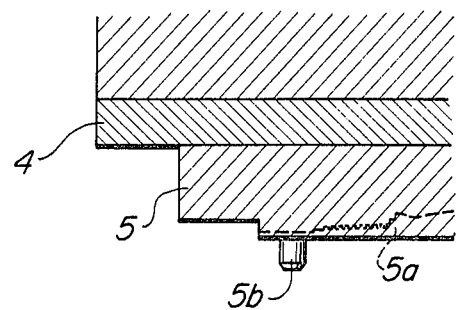
FIG. 2 is a side elevational view of the device shown in FIG. 1.
Figure 2:
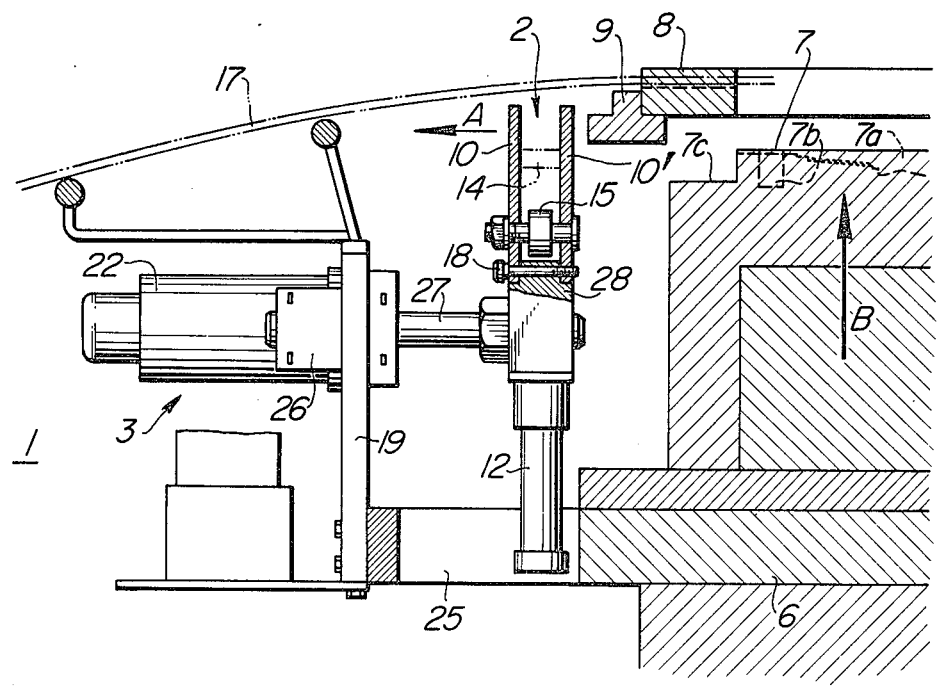
Figure 5:
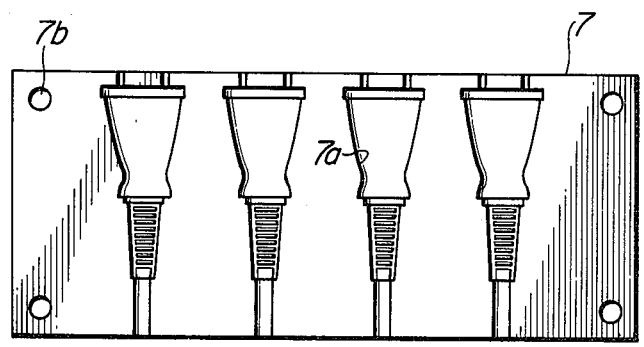
FIG. 5 is a top plan view of the movable mold part.

Referring first to FIGS. 1 and 2, there is shown a plug making machine equipped with a cord tension device of the invention generally designated at a reference numeral 1. The plug making machine has a plate 4, a stationary upper mold part 5 fixed to the plate 4, a plate 6, a movable lower mold part 7 fixed to the plate 6 and an auxiliary frame 8 disposed between both mold parts and adapted to move along rails 9. Mold cavities 5a and 7a are formed in the stationary and movable mold parts 5 and 7, respectively. As will be understood from FIGS. 5 and 6, more specifically, the mold cavities 5a and 7a are formed in plural in respective mold parts 5 and 7. Therefore, it is possible to conduct the formation of the plug 34 and cord protector 35 integral with the cord for a plurality of cords at a time. In these Figures, a reference numeral 7b designates a guide bore formed in the upper face of the movable mold part 7 and adapted to receive a locating pin 5b formed to project from the lower face of the stationary mold 5 when the mold parts are brought together.

The cord tension device 1 comprises a clamp device 2 and a driving device 3. The clamp device 2 has a pair of parallel side plates 10,10' and a plurality of clamp mechanisms 11 interposed between the side plates 10,10'. The number of clamp mechanisms 11 corresponds to the number of pairs of mold cavities 5a, 7a. Each clamp mechanism is connected to the cylinder rod 13 of a cylinder 12. The clamp mechanism 11 has a cord receiver 14 fixed between the side plates 10,10', a guide roller 15 rotatably mounted between the side plates 10,10', and a pivot lever 16. As will be seen from FIG. 1 there are formed a plurality of arcuate crests and valleys on the upper end of each side plate 10,10'. The arrangement is such that each valley receives a cord 17. Each cord receiver 14 has a top surface 14a located at the bottom of each valley and constituting a cord receiving surface for receiving the cord fitted to the valley.

The aforementioned pivot lever 16 is pivotally secured to the upper end of a connecting member 37 which is fixed to the upper end of the cylinder rod 13. As will be clearly seen from FIG. 1, the position of the centroid G of the pivot lever 16 is located at a distance to the right from the axis of the cylinder rod 13 for actuating this lever 16. Therefore, the pivot lever takes the position pivotally rotated in the clockwise direction to locate its right side edge in engagement with the guide roller 15 as shown in FIG. 1, in the normal state in which the cylinder rod 13 is extended. As the cylinder 12 is actuated to retract its cylinder rod downwardly, the pivot lever 16 is rotated in the counterclockwise direction as viewed in FIG. 1 keeping the engagement at its right side edge with the guide roller 15, to take the position shown in FIG. 3. In consequence, the cord 17 is clamped between the hook portion 16a of the pivot lever 16 and the upper surface 14a of the cord receiver 14. The upper surface 14a of the cord receiver 14 and the hook portion 16a of the pivot lever 16 are plated with chromium to permit a slight slip of the cord 17 clamped therebetween to avoid any excessive tension when the tension is applied in a manner explained later.

The cylinder 12 is adapted to be actuated when a limit switch 20 projecting to the right (FIG. 1) from the lower part of the side plate 19 is contacted by the key 21 which projects downwardly from the rail 19. A reference numeral 18 in FIG. 2 designates a bolt by which the side plates 10,10' are secured to each other.

Turning now to the driving device 3, this device includes a cylinder 22 attached to the side plate 19 and having a cylinder rod 23 which in turn is connected at its end to a stop plate 24 fixed to the lower parts of the side plates 10,10' of the clamp device 2. A pair of blocks 28 are fixed to both sides of the bottoms of the side plates 10,10'. A guide rod 27 is connected at its one end to each block 28 while the other end of the same (See FIG. 2) is slidably received by a guide block 26 secured to an upper part of the side plate 19. Therefore, as the cylinder rod 23 is extended and retracted by the operation of the cylinder 22, the side plates 10,10', i.e. the clamp device 2, is moved in the direction of arrow A and in the counter direction in FIG. 2 together with the cylinder rod 23, while being guided by the guide rod 27 and the guide block 26.

As shown in FIG. 2, the side plate 19 is unitarily connected at the lower end thereof to the plate 6 through the medium of a connecting member 25 so as to be moved up and down together with the plate 6 as the latter is driven vertically by a ram which is not shown. Although not illustrated in FIG. 1, the connecting member 25 is provided at lower parts of the side plate 19 near each of right and left sides of the latter as viewed in FIG. 1. The operation of the cylinder 22 is controlled by a limit switch 29 provided at the upper and left side portion of the side plate 19 and a key 30 projected downwardly from the rail 9.

Figure 6:
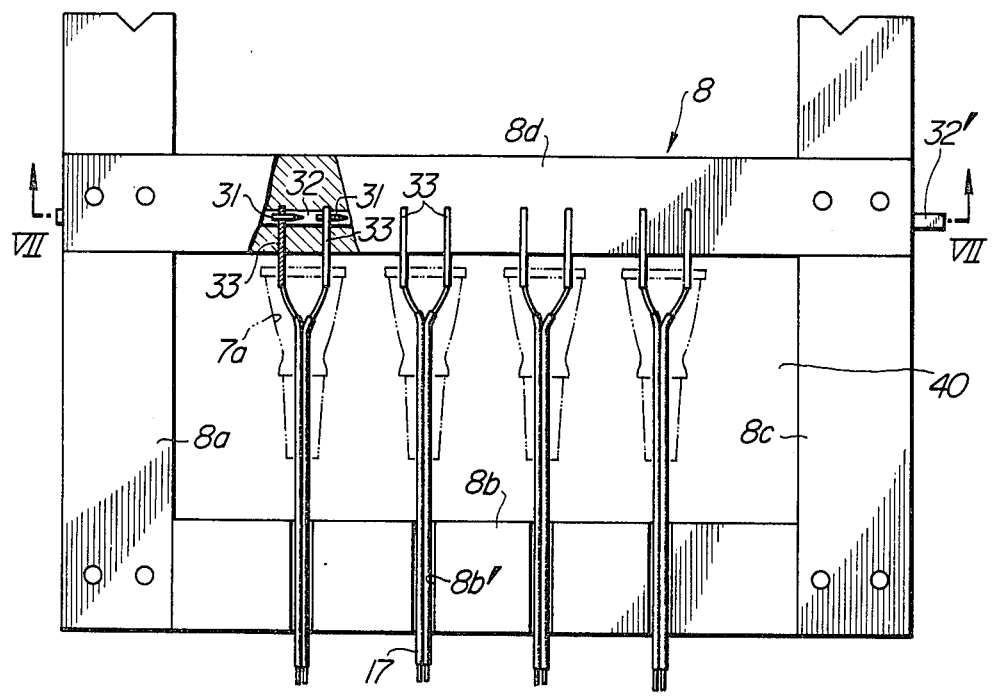
FIG. 6 is a plan view of a cord end fitted to an auxiliary frame incorporated in the plug making machine.
Figure 7:
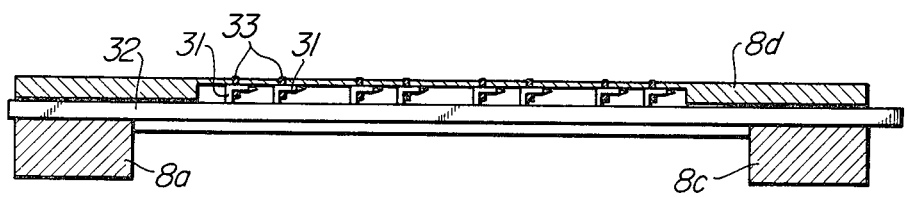
FIG. 7 shows the cord end as viewed in the direction of arrow line VII—VII.

As shown in FIGS. 6 and 7, the aforementioned auxiliary frame 8 is constituted by four frame members 8a and 8d assembled substantially in a rectangular form. The inside measurement of the rectangle is slightly slightly greater than the outside measurement of the upper end of the movable mold part 7 so that the lower end of the stationary mold part 5 and the upper end of the movable mold part 7 are received by the space 40 defined by the frame members 8a and 8d when these mold parts are brought together. Within the frame member 8d, mounted is an operation rod 32 for a sliding motion in the longitudinal direction. The operation rod 32 has a plurality of pairs of hook pins 31 only one of which is shown.

Figure 4:
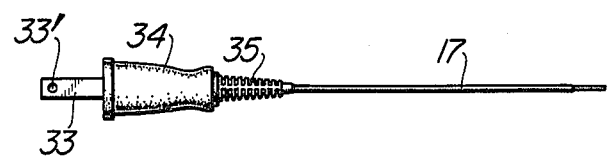
FIG. 4 is a front elevational view of a plug.

Each pair of the hook pins are adapted to fit in the bores 33' (See FIG. 4) of a corresponding pair of plug terminals of the associated cord 17 thereby to hold the plug terminals 33 at predetermined position of the auxiliary frame 8. The frame member 8b has supporting grooves 8b' formed therein and adapted to support the cords 17. Therefore, the auxiliary frame 8 constitutes a holding device which holds the plug terminals and cord ends connected to the latter at right positions in the mold parts when both mold parts 5 and 7 are brought together during operation of the plug making machine.

As shown in FIG. 6, as the operation rod 32 is retracted to the left, the hook pins 31 are extracted from the bores 33' of the plug terminals 33 to permit the cords 17 to be detached from the auxiliary frame 8.

Hereinafter, an explanation will be made as to how the plug making machine incorporating the device of the invention operates.

When the plug making machine takes the initial state shown in FIGS. 1 and 2, cords 17 with plug terminals 33 attached thereto are placed in the auxiliary frame 8 as shown in FIG. 6. Thereafter, a ram (not shown) operatively connected to the plate 6 is actuated to raise the plate 6 together with the movable mold part 7, clamp device 2 and the driving device 3. During the upward movement of the movable mold part 7, the step surface 7c of the movable mold part 7 is brought into contact with the lower face of the auxiliary frame 8 so that the latter is moved upward thereafter. Then, as the upward movement is continued further, the cords 17 are put into valleys between arcuate crests on the tops of the side plates 10,10' and, when the lower surface of the stationary mold part 5 is contacted by the upper surface of the movable mold part 7, the cords 17 are placed on the top surface 14a of the cord receiver 14. Also, the limit switch 20 is contacted by the key 21 when the lower face of the stationary mold part 5 and the upper surface of the movable mold part 7 are jointed to each other to turn on thereby to cause the operation of the cylinder 12 to retract the cylinder rod 13 downwardly.

Figure 3:
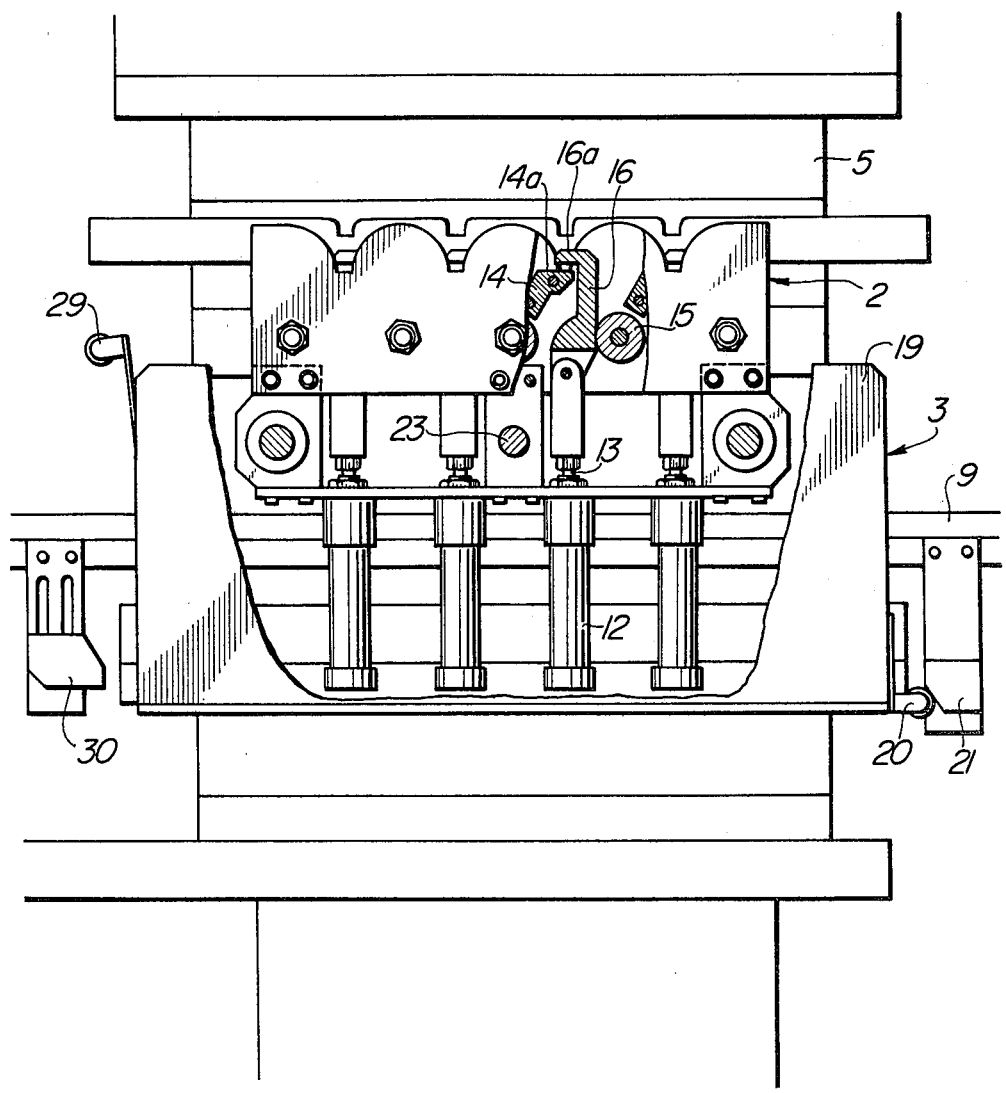
FIG. 3 is a front elevational view of a cord tension device in accordance with an embodiment of the invention, in the state raised together with the movable mold part.

Consequently, the pivot lever 16 is rotated counterclockwise as viewed in FIG. 1 to come to take the position shown in FIG. 3.

The cords 17 are safely clamped between the upper face 14a of the cord receiver 14 and the hook portion 16a of the pivot lever 16, when the plug making machine takes the position shown in FIG. 3. Then, the cylinder rod 23 of the cylinder 22 of driving device is retracted so that the clamp device 2 together with the cords clamped thereby is moved in the direction of the arrow A. In cosequence, the cords 17 are pulled and arranged under application of tension correctly on the axes of mold cavities formed by pairs of cavities 5a, 7a of the stationary and movable mold parts 5,7.

Then, a molten plastic is charged into the mold cavities to form, by injection molding, plugs 34 (FIG. 4) and cord protectors 35 (FIG. 4) on the ends of the cords 17. Since a slight slip is allowed for the cords clamped between the chrome-plated upper face 14a of the cord receiver 14 and the hooked portion 16a of the pivot lever 16, the cords are protected from the application of excessive tension.

After the forming of the plug 34 and cord protector by the injection molding, the ram (not shown) is operated to lower the plate 16 so that the movable mold part 7, auxiliary frame 8, clamp device 2 and the driving device 3 are lowered together with the plate 6. In the beginning period of this downward movement, the limit switch 20 in held in ON state, so that the clamp device 2 continues to clamp the cords 17. Therefore, when the movable mold part 7 is separated from the stationary mold 5 by the downward movement of thereof together with the auxiliary frame 8 and the clamp device 2, the plug 34 and the cord protector 35 formed on the cords 17 are preferably parted from the corresponding cavity 5a of the stationary mold part 5. As the plate 6 and, hence, the movable mold part 7, auxiliary frame 8 and the clamp device 2 are moved downward, the limit switch 20 clears the key 21 to turn off so that the clamp device 2 unclamps the cords 17. In this downward movement, the auxiliary frame 8 is brought into contact with the rail 9 and, thereafter, the movable mold part 7 is moved further downward leaving the auxiliary frame 8, so that the plugs 34 and the cord protectors 35 formed on one ends of the cords are left in the auxiliary frame 8 leaving the cavities 7a of the movable mold part 7.

As the plate 6 reaches the lowermost position in its stroke, the limit switch 29 contacts the key 30 to turn on, so that the cylinder rod 23 of the cylinder 22 is extended to cause the movement of the driving device 3 so that the plug making machine resumes the starting position shown in FIGS. 1 and 2.

Thereafter, the auxiliary frame 8 is moved to the position offset from the mold parts 5,7, along the rail and pushes the operation rod 32 to the left as viewed in FIG. 6 to disengage the hook pins 31 from the bores 33' of the plug terminals 33, so that the cords 17, now having plugs 34 and cord protectors 35 formed unitarily therewith, are allowed to be taken out of the auxiliary frame 8.

A plurality of auxiliary frames 8 are disposed on the rail 9. These auxiliary frames 8 are successively moved to the position between both mold parts 5,7 to conduct the work continuously. Namely, as the work is over with a first auxiliary frame 8, the latter is moved to the position out of the mold parts 5,7 and the second auxiliary frame 8 is moved into the molding position between both mold parts for the forming operation. The work is repeated in this way to produce the cords with plug and cord protector at a high rate of production. Preferably, the auxiliary frames are so arranged that their frame members 8c are directed toward the forward side of the rail 9, i.e. in the downstream direction of the movement of the auxiliary frames. According to such an arrangement, the right projected end 32' of the operation rod 32 is made to contact with the preceding auxiliary frame when the succeeding auxiliary frame is moved to the position out of the mold parts along the rail 9. It is, therefore, possible to disengage the hook pins 31 from the bores 33' of the plug terminals 33, by leftward movement of the operation rod 32 as viewed in FIG. 6.

As has been described, according to the invention, there is provided a plug tension device having an automatically operative clamp device and a driving device which also operates automatically. The cord tensioning operation is performed automatically to correctly set the cords in a tensed state along the axes of respective cavities of the mold device, to permit the formation of the plug and the cord protector in this state.

By arranging the cords on the axes of mold cavities under application of tension, various inconveniences such as deformation of mold due to weight of the cord are avoided, so that the cord protector is formed to have a uniform thickness distribution in the circumferential direction. At the same time, the efficiency of the mass production, as well as producibility, is very much increased by performing the tensioning operation automatically.

What is claimed is:

1. An electric plug making machine comprising:
    a mold having a stationary part and a movable part;
    said parts each having respective mold cavity portions forming a mold cavity for receiving an electric cord end connected to plug terminals for the integral molding of a plug and a cord protector when said movable part is moved to meet with said stationary part;
    a device for holding said plug terminals in a predetermined position in said mold cavity; and
    a cord tension device for applying a tensile force to the cord after the cord end is placed in said mold to correctly position the end in said cavity,
    said cord tension device including clamping means disposed outside said mold and adapted to clamp a portion of said cord projecting out of said mold, driving means disposed outside said mold for moving said clamping means away from said plug terminals thereby to hold taut the cord between said clamping means and the terminals and to position the cord correctly in said mold cavity, and means for automatically controlling the successive operation of said movable mold part, clamping means and driving means.

2. A plug making machine as claimed in claim 1, wherein said clamping means includes a cylinder arranged in a fixed relation to said movable mold part, a cord receiver disposed at the outside of said movable mold part in a fixed relation to the latter and adapted to receive the cord portion projecting out of said movable mold part, and a pivot lever connected to the cylinder rod of said cylinder and pivotally movable between a position for clamping the cord portion received by said cord receiver and another position for unclamping the cord portion, in accordance with the operation of said cylinder rod.

3. A plug making machine as claimed in claim 2 wherein said driving means includes a cylinder having a cylinder rod connected to said clamping means, whereby said clamping means clamping the cord end is moved away from said mold to impart a tension to the cord.

4. A plug making machine as claimed in claim 2 or 3, wherein said holding device includes an auxiliary frame of a substantially rectangular form which defines a space for receiving the junction between said movable mold part and said stationary mold part when said movable part is contacted with said stationary part, said auxiliary frame including a rod slidably mounted therein and having a plurality of hook pins fixedly secured thereto, each of said hook pins being engageable in a bore of one of the plug terminals to hold the same in said mold when said rod is slid in one direction, and being disengaged from the bore when said rod is slid in the other direction.

* * * * *